US012688281B2

(12) United States Patent
Bolocan et al.

(10) Patent No.: US 12,688,281 B2
(45) Date of Patent: Jul. 21, 2026

(54) AUTOMATED AI MODEL-BASED PIPELINE FOR DETECTION EXPLAINABILITY

(71) Applicant: CrowdStrike, Inc., Sunnyvale, CA (US)

(72) Inventors: Diana Bolocan, Iași (RO); Mihaela-Petruta Gaman, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 65 days.

(21) Appl. No.: 18/678,899

(22) Filed: May 30, 2024

(65) Prior Publication Data

US 2025/0371138 A1 Dec. 4, 2025

(51) Int. Cl.
*G06F 21/55* (2013.01)

(52) U.S. Cl.
CPC .................................. *G06F 21/552* (2013.01)

(58) Field of Classification Search
CPC ......... G06F 21/552; G06F 21/50; G06N 3/08; G06N 5/045; G06N 7/01; G06N 20/00; G06N 20/20; H04L 63/1425; H04L 63/1416; H04L 63/1441; H04L 63/1433; H04L 63/14
See application file for complete search history.

(56) References Cited

U.S. PATENT DOCUMENTS

| | | | |
|---|---|---|---|
| 11,736,513 B1 | 8/2023 | Mulugeta et al. | |
| 2021/0312282 A1* | 10/2021 | Hernandez Leal | ..... G06F 18/22 |
| 2022/0214903 A1* | 7/2022 | Zhao | ...................... G06N 20/00 |
| 2022/0414206 A1* | 12/2022 | Hinkle | ................... G06F 21/53 |
| 2023/0088436 A1* | 3/2023 | Kramme | ............. G06Q 20/102 |
| | | | 705/44 |
| 2024/0013185 A1* | 1/2024 | Gao | ...................... G06V 10/764 |
| 2025/0225329 A1* | 7/2025 | Raghunathan | ........ G06F 21/554 |

OTHER PUBLICATIONS

Skypilotv [online]. 2024 GitHub, Inc. [retrieved on May 30, 2024]. Retrieved from the Internet <https://github.com/skypilot-org/skypilot>.
OpenAI LLM Email Assistant [online]. Robocorp [retrieved on May 30, 2024]. Retrieved from the Internet <https://robocorp.com/portal/robot/robocorp/example-llm-emails>.

(Continued)

*Primary Examiner* — Wasika Nipa
*Assistant Examiner* — Edgar W Xie
(74) *Attorney, Agent, or Firm* — Womble Bond Dickinson (US) LLP

(57) ABSTRACT

The present disclosure provides techniques for AI model-based detection explainability. A processing device obtains computer-readable text and an indication of a false positive detection of malicious behavior with respect to the computer-readable text by a cybersecurity system, The processing device obtains, via an artificial intelligence (AI) model trained to generate language, a reason for the false positive detection of the malicious behavior. The processing device provides an indication of the reason for the false positive detection to a destination device.

20 Claims, 5 Drawing Sheets

(56) References Cited

OTHER PUBLICATIONS

Retrieval augmented generation: Keeping LLMs relevant and current, Oct. 18, 2023 [online]. Blog [retrieved on May 30, 2024], Retrieved from the Internet <https://stackoverflow.blog/2023/10/18/retrieval-augmented-generation-keeping-llms-relevant-and-current/>.

Plate, Henrik, LLM-assisted Malware Review: AI and Humans Join Forces to Combat Malware, Apr. 17, 2023, [retrieved May 30, 2024], Retrieved from the Internet <https://www.endorlabs.com/learn/llm-assisted-malware-review-ai-and-humans-join-forces-to-combat-malware>.

Englin, Ofir, Use Case: Build a Unique Email Reply Assistant, May 30, 2023, [retrieved May 30, 2024], Retrieved from the Internet <https://blog.promptchainer.io/p/use-case-build-a-unique-email-reply>.

* cited by examiner

200 —

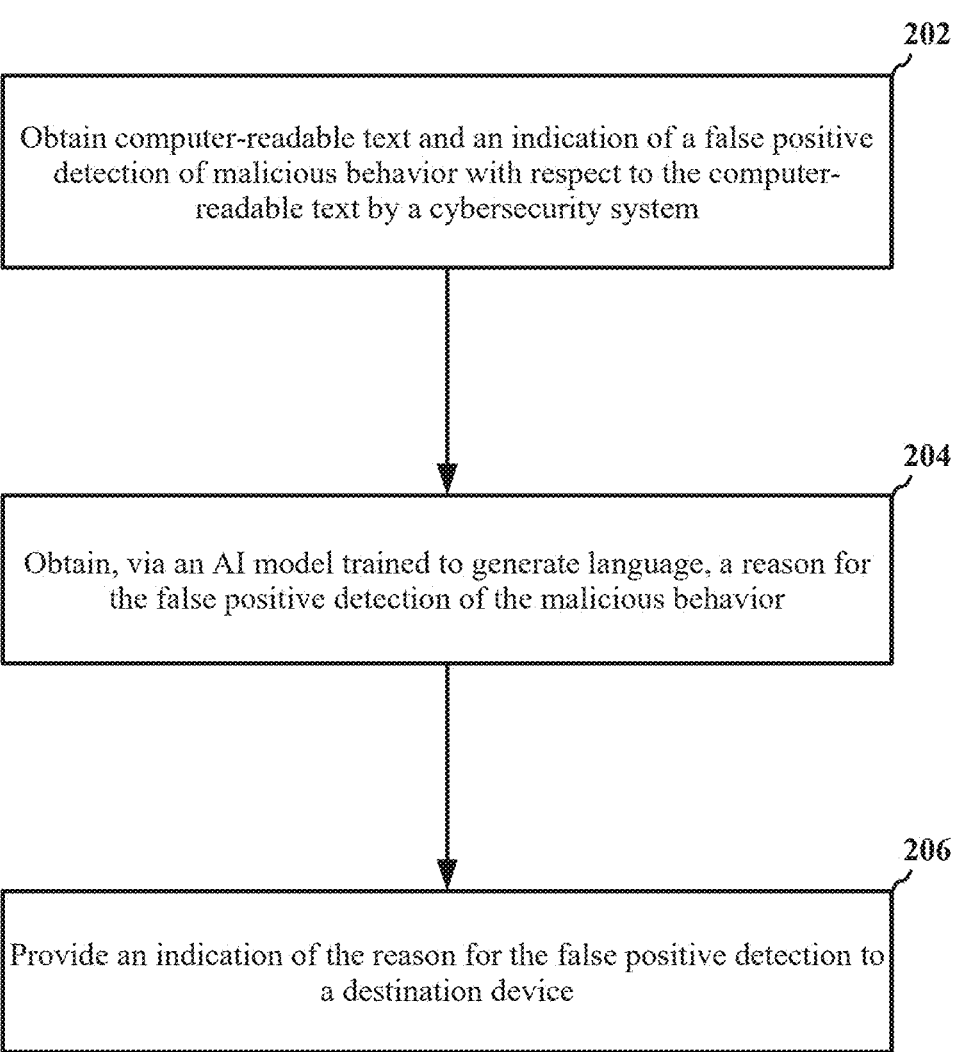

202

Obtain computer-readable text and an indication of a false positive detection of malicious behavior with respect to the computer-readable text by a cybersecurity system

204

Obtain, via an AI model trained to generate language, a reason for the false positive detection of the malicious behavior

206

Provide an indication of the reason for the false positive detection to a destination device

FIG. 2

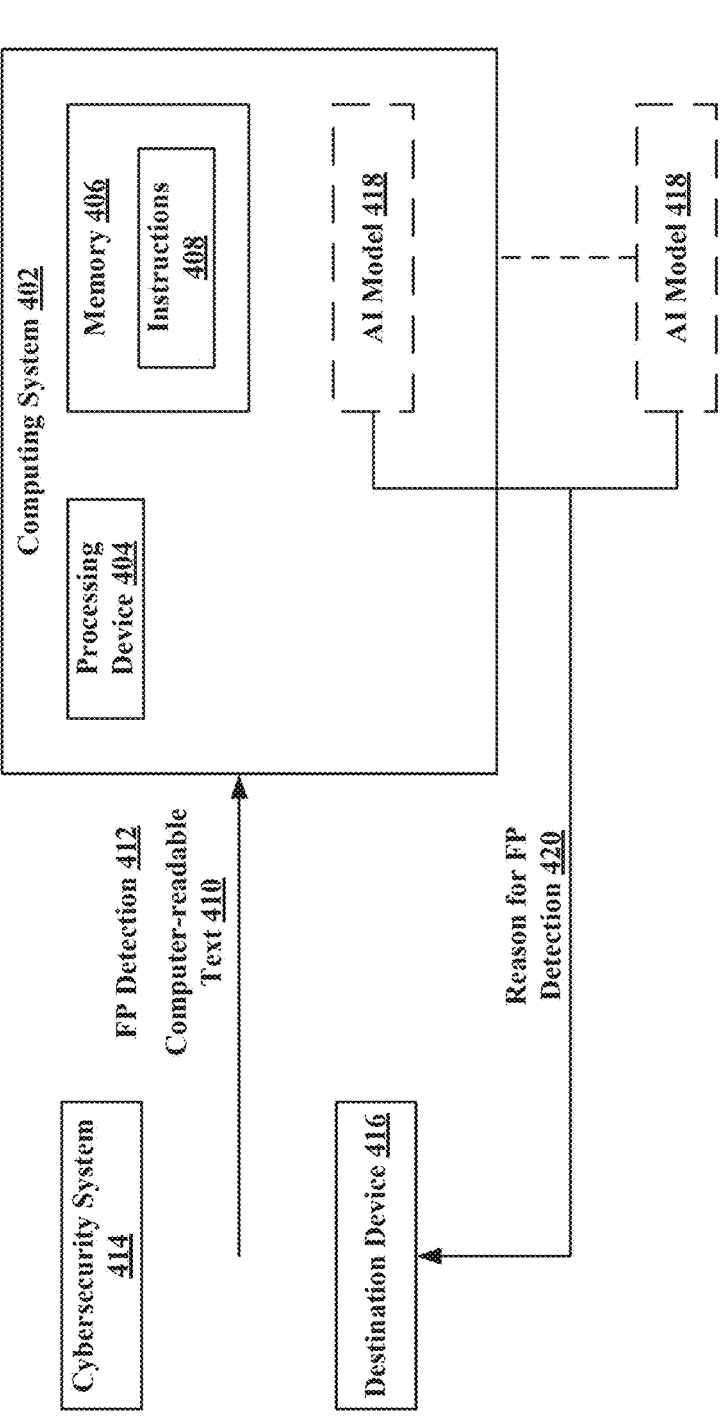
FIG. 4

AUTOMATED AI MODEL-BASED PIPELINE FOR DETECTION EXPLAINABILITY

TECHNICAL FIELD

Aspects of the present disclosure relate to cybersecurity, and more particularly, to an automated artificial intelligence (AI) model-based pipeline for detection explainability.

BACKGROUND

Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing mathematical and computational frameworks used to extract patterns and insights from data. Large language models (LLMs), a category within machine learning models, are trained on vast amounts of text data to capture the nuances of language and context. By combining advanced machine learning techniques with enormous datasets, large language models harness data-driven approaches to achieve highly sophisticated language understanding and generation capabilities. AI models include machine learning models, large language models, and other types of models that are based on neural networks, genetic algorithms, expert systems, Bayesian networks, reinforcement learning, decision trees, or combination thereof.

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware.

Model explainability refers to a process of analyzing a machine learning model output in a manner that can be understood by a human. For example, for some types of machine learning models (e.g., neural networks), it may not be readily apparent as to how parameters (e.g., weights) of the machine learning models impact an output of the machine learning models. Model explainability seeks to provide an explanation as to why a machine learning model generated a particular output based on a particular input. Model explainability techniques may include local model explainability techniques, cohort model explainability techniques, and global model explainability techniques.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a flow diagram of a method of AI model-based detection explainability in accordance with some aspects of the present disclosure.

FIG. 4 is a block diagram that illustrates an example system for AI model-based detection explainability in accordance with some aspects of the present disclosure.

DETAILED DESCRIPTION

Figure 1:
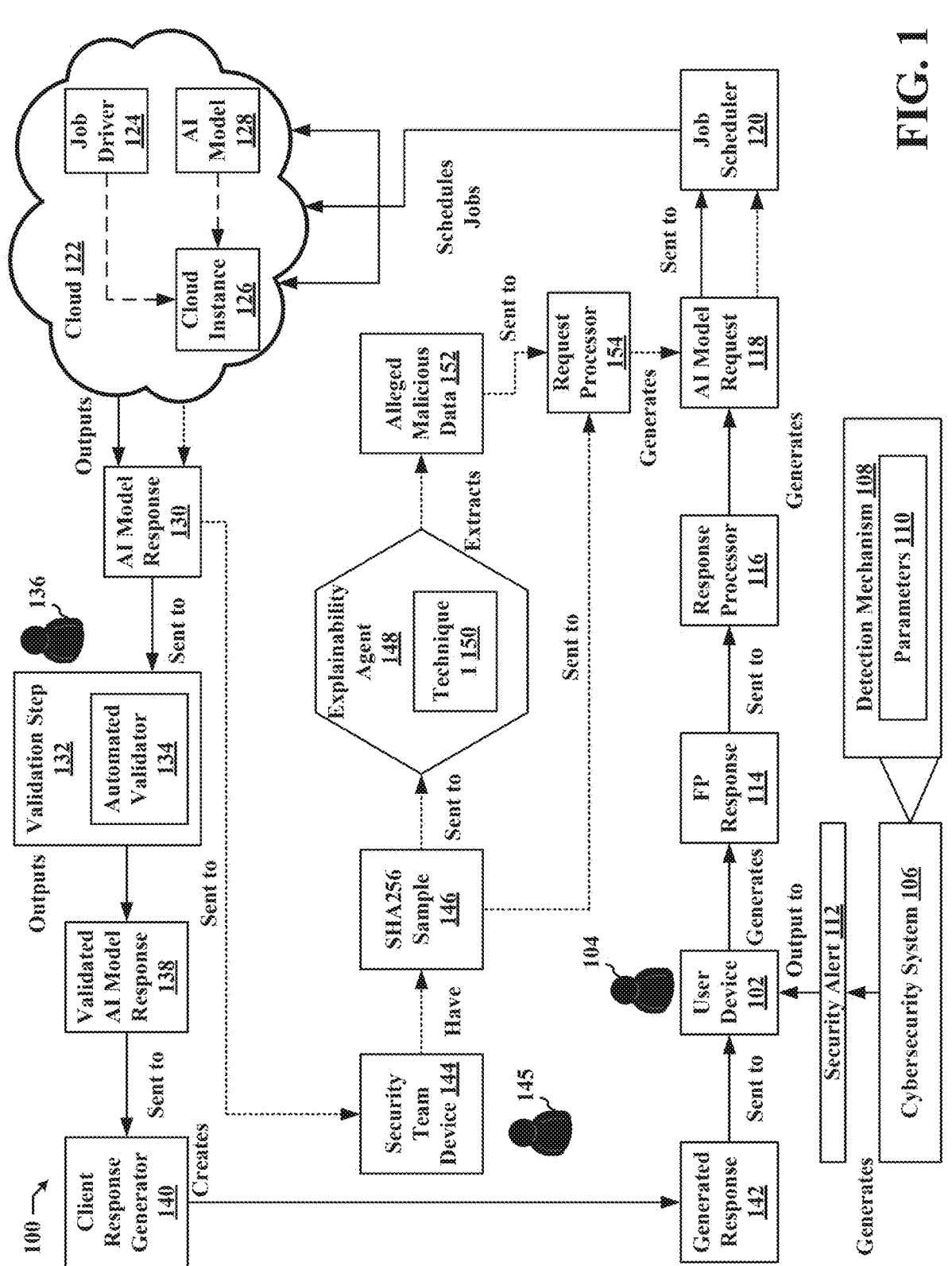
FIG. 1 is a block diagram that illustrates an example system for AI model-based detection explainability in accordance with some aspects of the present disclosure.

A cybersecurity system (e.g., cybersecurity software including computer-readable instructions) may be configured to protect computing systems (e.g., a computing system of an organization), networks, and digital assets from theft, damage, unauthorized access, and various forms of cyber threats. In an example, a cybersecurity system may identify an application executing on a computing device operated by a user as potential malware. The cybersecurity system may then stop and/or block the application from executing in order to protect the computing device, as well as an overall network to which the computing device belongs. While cybersecurity systems may be effective in protecting computing systems and networks from malicious behaviors, a cybersecurity system may sometimes mistakenly identify a process or data (e.g., an application, a link within an email, etc.) as malicious when the process or the data point is actually legitimate (i.e., benign). A detection of malicious behavior with respect to a process or data when the process or data is not related to malicious behavior may be referred to as a false positive (FP) detection. In an example, a cybersecurity system may detect a link within an email as being a link to malware, when the link is actually related to a legitimate website. The cybersecurity system may prevent the link from being accessed by a computing device of a user based on the detection, which may frustrate a user of the computing device.

When a computing device of a user receives an indication of an FP detection from a cybersecurity system, the user may set forth input to the computing device reporting the FP detection to an administrator of a network to which the computing device belongs. The report of the FP detection may be referred to as a ticket. The administrator may utilize different approaches to handle the ticket, such as machine learning-based approaches (e.g., clustering, model explainability), data analytics-based approaches, rule-based approaches, manual approaches, or a combination thereof. In one example, model explainability may be used to highlight influential portions of the computer-readable text that led to the cybersecurity system (e.g., a machine learning model of the cybersecurity system that is integrated into the cybersecurity system and that performs malware detection on certain types of inputs) identifying the computer-readable text as malicious. Computer-readable text may refer to text that may be read by a processing device. However, model explainability may output numerical values that indicate an importance of certain features in determining detections of malicious behaviors. As such, an administrator may have to draw upon machine learning knowledge and as well as cybersecurity knowledge to draw conclusions based on the numerical value; however, the administrator may not have expertise in both these areas. In another example, the administrator may utilize data analytics which rely on metadata of samples; however, this approach may not be feasible when metadata is missing for a sample. In a further example, a rule-based approach may be utilized to address the ticket. However, rule-based approaches may lack flexibility and generalization. For instance, a rule-based approach may miss certain behaviors that are difficult to capture via regular expression matching or yet another ridiculous acronym (YARA) matching. As such, the administrator may perform manual-fine tuning on the rules, which may be inefficient. In one example, the administrator may adjust parameters of the cybersecurity system such that the cybersecurity system no longer falsely identifies a process or data as malicious. The aforementioned approaches may result in an inefficient use of computational resources, network resources, and storage resources. For instance, in certain scenarios, a computing device may store many different tickets from many different user devices until the tickets are resolved, which may be burdensome on storage resources of an organization.

The present disclosure addresses the above-noted and other deficiencies by using an AI model trained to generate language to aid in model explainability. For instance, the technologies described herein may utilize generative artificial intelligence to automate the handling of false positive detection by cybersecurity systems. As noted above, "false positive detection" refers to a detection of malicious behavior (e.g., by a cybersecurity system) with respect to a process or data when the process or data is not related to malicious behavior. The technologies described herein may provide clarity as to why a false positive detection occurred. For instance, the technologies described herein include a pipeline that uses an AI model (e.g., an LLM) to automatically generate detection explanations that explain both detection of false positives and that directly answer tickets. The technologies described herein may provide both short-term and long-term responses to false positive detections. In the short-term, the technologies herein may be utilized to create workaround rules that mitigate false positive detection. In the long-term, the technologies described herein may be utilized to improve a detection mechanism (e.g., a machine learning model) of a cybersecurity system. For instance, the technologies described herein may be used to accelerate a corpus growth for the cybersecurity system and/or to accelerate machine learning-based model explainability. Thus, the technologies described herein may reduce an amount of computing resources, network resources, and storage resources used to address tickets pertaining to false positive detection of malicious behaviors. The technologies described herein may also reduce an amount of time used by administrators to address the tickets. The technologies described herein may additionally facilitate updating machine learning models to more accurately identify malicious behaviors.

In an example, a processing device obtains computer-readable text and an indication of a false positive detection of malicious behavior (e.g., malware) with respect to the computer-readable text by a cybersecurity system. The processing device obtains, via an artificial intelligence (AI) model trained to generate language, a reason for the false positive detection of the malicious behavior with respect to the computer-readable text by the cybersecurity system. The processing device provides an indication of the reason for the false positive detection to a destination device (e.g., a computing device of a user, a computing device of an administrator, a computing device of a security team, a device that executes the cybersecurity system, etc.).

The reason for the false positive detection may be utilized for several purposes. In one example, the reason for the false positive detection may be provided to a computing device of a user, where the computing device may present the reason to the user on a display. This example may reduce network traffic associated with resolving instances of FP detection. For instance, the aforementioned example may avoid multiple communication exchanges between the computing device of the user and a computing device of an administrator in order for the user to understand why the computer-readable text was identified as malicious.

In another example, the reason for the false positive detection may be provided to a computing device that manages or develops the cybersecurity system. The computing device may then modify parameter(s) of a detection mechanism of the cybersecurity system such that the computer-readable text (and other similar instances of computer-readable text) are not detected by the cybersecurity system as malicious. For instance, the computing device may modify rules of the cybersecurity system. Alternatively, the computing device may retrain or fine-tune a machine learning model (e.g., a neural network) based on the indication of the computer-readable text and the reason for the false positive detection. Modifying the parameter(s) of the detection mechanism may result in future detections that more accurately detect malicious behaviors.

In yet another example, the reason for the false positive detection may be provided to a computing device that manages or develops the cybersecurity system. The computing device may determine that a detection mechanism (e.g., a machine learning model) of the cybersecurity system was not trained on sufficient data pertaining to a particular type of malicious behavior (e.g., phishing attacks). The computing device may obtain additional training data pertaining to the particular type of malicious behavior. The computing device may retrain or fine-tune the detection mechanism (e.g., a machine learning model, such as a neural network) based on the additional training data. Retraining or fine-tuning the detection mechanism based on the additional training data may result in the cybersecurity system more accurately detecting malicious behaviors.

In a further example, the computer-readable text includes a first portion related to the false positive detection and a second portion unrelated to the false positive detection. The first portion of the computer-readable text that has been identified as malicious may be provided to a computing device that executes an explainability model. The computing device may provide the first portion (as opposed to an entirety of the computer-readable text) to the explainability model in order to generate an explanation as to why the cybersecurity system identified malicious behavior with respect to the computer-readable text, which may result in improved performance with respect to the explainability model. The reason and the first portion may also be utilized to modify parameter(s) of the explainability model. In some aspects, the explainability model may extract a malicious portion of the computer-readable text and the AI model may generate an explanation as to why the malicious portion was identified as malicious by the AI model. In such aspects, tasks performed by a cybersecurity specialist may instead be performed by the AI model.

Thus, vis-à-vis obtaining, via the AI model trained to generate language (i.e., a generative AI model), a reason for the false positive detection of the malicious behavior with respect to the computer-readable text by the cybersecurity system and providing the indication of the reason for the false positive detection to the destination device, the above-described technologies may provide for various technological improvements. For instance, the above-described technologies may reduce the amount of computational resources, network resources, and storage resources used to resolve false positive detections by cybersecurity systems. The above-described technologies may also facilitate the development of detection mechanisms (e.g., machine learning models) that more accurately detect malicious behavior.

As discussed herein, the present disclosure provides an approach that improves the operation of a computer system by reducing the amount of computational resources, network resources, and storage resources used to resolve false positive detections by cybersecurity systems. In addition, the present disclosure provides an improvement to the technological field of cybersecurity by facilitating the development of detection mechanisms (e.g., machine learning models) that more accurately detect malicious behavior FIG. 1 is a block diagram 100 that illustrates an example system for AI model-based detection explainability in accordance with some aspects of the present disclosure. The system includes a user device 102 operated by a user 104. In an example, the user device 102 is a desktop computing device, a laptop computing device, a tablet computing device, a gaming console, a wearable computing device, or a smartphone. In an example, the user device 102 belongs to a network of computers managed by an organization. The user device 102 may include some or all of the elements (e.g., a processing device, a video display etc.) described below with respect to the computing system in FIG. 5.

The system further includes a cybersecurity system 106. In an example, the cybersecurity system 106 includes cybersecurity software including computer-readable instructions for performing cybersecurity related functionality. The cybersecurity system 106 may run on the user device 102, on a server device (not depicted in FIG. 1) managed by an organization, on a cloud-based server (not depicted in FIG. 1), or a combination thereof.

The cybersecurity system 106 includes a detection mechanism 108 (i.e., a malware detection mechanism). The detection mechanism 108 is configured to identify behavior that occurs on or with respect to the user device 102 (as well as other client devices) as malicious (i.e., as malicious behavior). In an example, the malicious behavior may be or include malware. Malware may refer to software designed to cause a disruption to a computer, a server, the user device 102, or a computing network, leak private information, gain unauthorized access to information or systems, deprive access to information, or otherwise interfere with computer security and privacy. Malware may include computer viruses, worms, Trojan horses, ransomware, spyware, adware, rogue software, wipers, and keyloggers. Malicious behavior may also include links (e.g., hyperlinks) to malware.

The detection mechanism 108 may be characterized by parameters 110 that influence whether or not behavior on or with respect to the user device 102 is malicious. In one aspect, the parameters 110 include a set of rules. The cybersecurity system 106 may identify a process or data (e.g., computer-readable text) as malicious based on the set of rules. In an example, the cybersecurity system 106 may perform regular expression (regex) matching or yet another ridiculous acronym (YARA) matching with respect to the process or the data in order to identify malicious behavior. In another aspect, the parameters include a set of learned parameters, where the learned parameters are learned (and potentially adjusted over time) based on training data. The cybersecurity system 106 may identify the process or the data as malicious based on the set of learned parameters. In an example, the detection mechanism 108 includes a neural network and the set of learned parameters include weights of the neural network. For instance, the neural network may include an input layer, one or more hidden layers, and an output layer, where the weights connect the input layer to the one or more hidden layers and where the weights connect the one or more hidden layers to the output layer. Values of the weights are influenced via a training process based on training data. In one aspect, the parameters 110 include a combination of the set of rules and the learned parameters.

In an example, the user device 102 may be managed by/belong to a first organization. In one aspect, a second organization may provide the cybersecurity system 106 to the first organization. In such an aspect, the parameters 110 may be based on samples provided by the first organization and/or publicly available samples. In an example, a sample in the said set of samples may include an indication of a malicious behavior (e.g., a link known to be malicious) and a ground truth label that indicates that the link is malicious. The sample may also include other information generally referred to as metadata. In one aspect, the parameters 110 may initially be based on publicly available samples. For instance, rules may be created based on the publicly available samples or a machine learning model (e.g., a neural network) may be trained based on the publicly available samples. The parameters 110 may then be later customized for the first organization based on samples provided by the first organization. For instance, rules may be modified, deleted, or added based on the samples provided by the first organization or a machine learning model may be retrained or fine-tuned based on the samples provided by the first organization.

The cybersecurity system 106, via the detection mechanism 108, may detect behavior that occurs on or with respect to the user device 102 as malicious. In one example, the user device 102 receives a selection of a link (e.g., a uniform resource locator (URL)) displayed on a video display of the user device 102. The detection mechanism 108 may identify the link as malicious behavior based on the parameters 110. In an example, the link is not actually malicious, and hence the detection mechanism 108 had a false positive detection with respect to the link.

The cybersecurity system 106 may prevent the behavior that occurs on or with respect to the user device 102 based on the behavior being identified as malicious. For example, the cybersecurity system 106 may prevent a web browser of the user device 102 from opening the link. The cybersecurity system 106 may generate a security alert 112 that is output to the user device 102, whereupon the user device 102 may present the security alert 112 to the user 104 (e.g., on a video display). In an example, the security alert 112 may indicate that the behavior has been identified by the cybersecurity system as malicious.

In an example, the user 104 may determine that the behavior identified by the detection mechanism 108 as malicious is not actually malicious, that is, the behavior detected as malicious is an FP. The user device 102 may receive input from the user 104 that is indicative of the FP. The user device 102 may generate an FP response 114 based on the input. The FP response 114 may include computer-readable text that has been identified as malicious and an indication that the computer-readable text is not malicious (i.e., an indication of an FP detection). In an example, the computer-readable text may be or include an email, a script, a URL, a text message, a team communication platform message, and/or source code. In an example, the FP response 114 may be an email message. For example, the email message may include the following: "Hi Administrator, link XYZ was identified as being a link to malware. This link is not malware and I need it to perform a task. Could you please assist? Best, John Doe." The FP response 114 may also be referred to as a ticket.

The user device 102 may send the FP response to a response processor 116. The response processor 116 may be implemented on the user device 102, on another device managed by an organization to which the user device 102 belongs, or on a device managed by an organization that manages the cybersecurity system 106. The response processor 116 may generate an AI model request 118 based on the FP response 114. For example, the response processor 116 may edit and/or reformat the FP response 114 to generate the AI model request 118 that is in a format that is readily accepted/interpreted by an AI model that is trained to generate language. For example, the AI model request 118 may include the following: "Analyze why link XYZ was identified as malicious" or "Analyze why link XYZ was wrongly identified as malicious." In one aspect, the AI model request 118 may be an input prompt.

The user device 102 (or another device managed by the organization to which the user device 102 belongs or on the device managed by the organization that manages the cybersecurity system 106) may provide the AI model request 118 to a job scheduler 120. The job scheduler 120 schedules a job (i.e., processing by an AI model) in a cloud 122 (i.e., a cloud-based computing platform) based on the AI model request 118. The job scheduler 120 allocates resources (e.g., network resources) for the AI model request 118 based on receiving the AI model request 118. The user device 102 may belong to an organization that manages a plurality of computing devices operated by a plurality of users in a network. In an example, the plurality of computing devices may generate a plurality of FP responses. The job scheduler 120 reduces usage of the network by automatically scheduling and allocating resources for AI model requests in order to ensure that processing instances run when AI model requests are to be handled and that the processing instances cease to run when the AI model requests are processed.

Subsequent to scheduling the job for the AI model request 118, the job scheduler 120 provides (e.g., transmits) the AI model request 118 to the cloud 122. A job driver 124 of the cloud 122 may generate a cloud instance 126 in the cloud 122. In an example, the cloud instance 126 may be a virtual machine in the cloud. The cloud instance 126 executes an AI model 128 (e.g., an LLM) that is trained to generate language. The AI model 128 may be configured to achieve language generation and other natural language processing (NLP) tasks such as classification by learning statistical relationships from text documents during a computationally intensive self-supervised and semi-supervised training process. In one aspect, the AI model 128 is a publicly available, general-purpose AI model. In another aspect, the AI model 128 is a private AI model of an organization that manages the user device 102 or a private AI model of an organization that manages the cybersecurity system 106. The cloud instance 126 may provide the AI model request 118 to the AI model 128 and the AI model 128 may generate an AI model response 130 based on the AI model request 118 and parameters (e.g., weights) of the AI model 128.

The AI model response 130 may include a reason for the FP detection of the malicious behavior with respect to the computer-readable text by the cybersecurity system 106. For example, the AI model response 130 may include an assessment of the maliciousness of the computer-readable text and an explanation of the reason. In an example, the assessment may be a numerical value ranging from zero to ten, with zero being the least malicious and ten being the most malicious. The explanation of the reason may be in a conversational format easily understood by the user 104. For example, the explanation of the reason may be "Link XYZ was mistakenly identified as malicious due to reason A." The AI model response 130 may also identify specific subsections (i.e., portions) of the computer-readable text which can be further leveraged by the cybersecurity system 106 for visualization and validation. Identification of specific subsections of the computer-readable text can be used to address a ticket in a semi-automated manner. The cloud 122 may output the AI model response 130 after generating the AI model response 130. Based on the scheduled job, the job driver 124 may automatically deallocate resources used for the cloud instance 126 after the cloud 122 outputs the AI model response 130.

The cloud 122 may output the AI model response 130 to a first computing device (not depicted in FIG. 1) managed by the organization that manages the cybersecurity system 106 or the cloud 122 may output the AI model response 130 to a second computing device (not depicted in FIG. 1) of an organization to which the user device 102 belongs. The first computing device or the second computing device may perform a validation step 132 on the AI model response 130 to ensure that the AI model response 130 is valid. For instance, some AI models (e.g., LLMs) may generate a response that is factually incorrect, nonsensical, or disconnected from an input prompt. Such a response may be referred to as a "hallucination." The validation step 132 may ensure that the AI model response 130 is not factually incorrect, nonsensical, or disconnected from the input prompt. If the AI model response 130 is invalid, the system may discard the AI model response 130.

In one aspect, the validation step 132 may be performed by an automated validator 134. The automated validator 134 may perform the validation step 132 based on a set of rules or based on a machine learning model. Additionally, or alternatively, a response team member 136 may manually inspect the AI model response 130 on a computing device to ensure that the AI model response 130 is valid.

Upon successful performance of the validation step 132, the first computing device or the second computing device may output a validated AI model response 138. The first computing device or the second computing device may provide the validated AI model response 138 to a client response generator 140. The client response generator 140 may be implemented on the first computing device or the second computing device. The client response generator 140 may create a generated response 142 based on the validated AI model response 138. In an example, the client response generator 140 may populate fields of a template with the validated AI model response 138 (or portions thereof). In some aspects, the client response generator 140 may preprocess the validated AI model response (e.g., by removing portions not relevant to the user 104).

The first computing device or the second computing device may send the generated response 142 to the user device 102. The user device 102 may present the generated response 142 to the user 104 (e.g., on a video display). Thus, the system may provide an automated manner of addressing tickets from the user 104 by leveraging the AI model 128.

The AI model response 130 may also be utilized to improve the cybersecurity system 106, model explainability techniques, and/or the AI model 128 itself. In one aspect, the cloud 122 may output the AI model response 130 to a security team device 144 operated by a security team member 145. In an example, the security team device 144 is managed by an organization that manages the cybersecurity system 106. The security team device 144 and the security team member 145 may also be referred to as a response team device, a research analysis device, or a data scientist device. The security team member 145 may also be referred to as a response team member, a research analysis member, or a data scientist.

In one aspect, the security team member 145 is an internal user that wishes to understand behavior of the detection mechanism 108 or another detection mechanism that has not yet been added to the cybersecurity system 106. With more particularity, the security team member 145 may wish to evaluate capabilities of the detection mechanism 108, such as to create a malware coverage report or to run a false positive discovery and mitigation procedure. As such, the security team device 144 may receive input causing the security team device 144 to query available datasets (not depicted in FIG. 1) using a secure hash algorithm 256 (SHA256) unique identifier. In an example, the query produces query results including a SHA256 sample 146 (or multiple SHA256 samples). The security team device 144 may provide the SHA256 sample to a request processor 154. The request processor 154 may generate an AI model request based on the SHA256 sample 146.

In one aspect, the security team device 144 sends the SHA256 sample 145 to an explainability agent 148. The explainability agent 148 may be or include an explainability model. The explainability agent 148 may applies a first technique 150 (i.e., a first explainability technique) to extract alleged malicious data 152 from the SHA256 sample 146. The explainability agent 148 may also apply other techniques to extract the alleged malicious data 152. The security team device 144 (or another device executing the explainability agent 148) may provide the alleged malicious data to the request processor 154. The request processor 154 may generate an AI model request based on the alleged malicious data 152.

In one aspect, the validated AI model response 138 (or the AI model response 130) may be utilized to modify the parameters 110 of the detection mechanism 108. In an example, when parameters 110 include a set of rules, a rule in the set of rules may be modified such that the computer-readable text (or similar computer-readable text) is not wrongfully identified as malicious again. In another example, when the parameters 110 include learned parameters (e.g., weights) of a machine learning model, the learned parameters may be modified based on the computer-readable text and the AI model response 130. For instance, the machine learning model may be retrained or fine-tuned based on the computer-readable text and the AI model response 130. In this manner, instances of FP detection may be reduced. In a specific example, the AI model response 130 may indicate that the computer-readable text is incorrectly being identified as a phishing attack. Furthermore, the AI model 128 may generate additional AI model responses based on AI model requests from other client devices (not depicted in FIG. 1) that also indicate that other instances of computer-readable text are being incorrectly identified as phishing attacks. In the example, a number of the instances of the computer-readable text that are being incorrectly identified is greater than a threshold number. Based on the number of instances being greater than the threshold number, the cybersecurity system 106 may determine that additional training data pertaining to phishing attacks is to be used to improve the detection mechanism 108. The cyber-security system 106 may obtain additional training data pertaining to phishing and retrain or fine-tune a machine learning model (i.e., the detection mechanism 108) such that the machine learning model is able to more accurately identify phishing attacks.

Although the AI model 128 is described above as being executed within the cloud, other possibilities are contemplated. In one aspect, the AI model 128 may execute on a device (e.g., a server computing device) of an organization that manages the cybersecurity system 106. In another example, the AI model 128 may execute on a device (e.g., a server computing device) of an organization that manages the user device 102.

FIG. 2 is a flow diagram 200 of a method for AI model-based detection explainability in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the AI model 128 (shown in FIG. 1), the processing device 404 (shown in FIG. 5), the processing device 502 (shown in FIG. 5), or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 202, the processing logic obtains computer-readable text and an indication of a false positive detection of malicious behavior with respect to the computer-readable text by a cybersecurity system. In an example, the computer-readable text and the indication of the false positive detection may be included in a ticket. In an example, the cybersecurity system may be or include the cybersecurity system 106. In an example, the computer-readable text and the indication of the false positive detection may be included in the AI model request 118.

At block 204, the processing logic obtains, via an AI model trained to generate language, a reason for the false positive detection of the malicious behavior with respect to the computer-readable text by the cybersecurity system. In an example, the AI model may be or include the AI model 128. In an example, the reason for the false positive detection may be included in the AI model response 130.

At block 206, the processing logic provides an indication of the reason for the false positive detection to a destination device. In an example, the reason for the false positive detection may be included in the AI model response 130. In an example, the destination device may be or include the user device 102, the security team device 144, a device that manages/operates the cybersecurity system, a device that manages/operates an explainability model, a device that manages the AI model, or another device.

Figure 3:
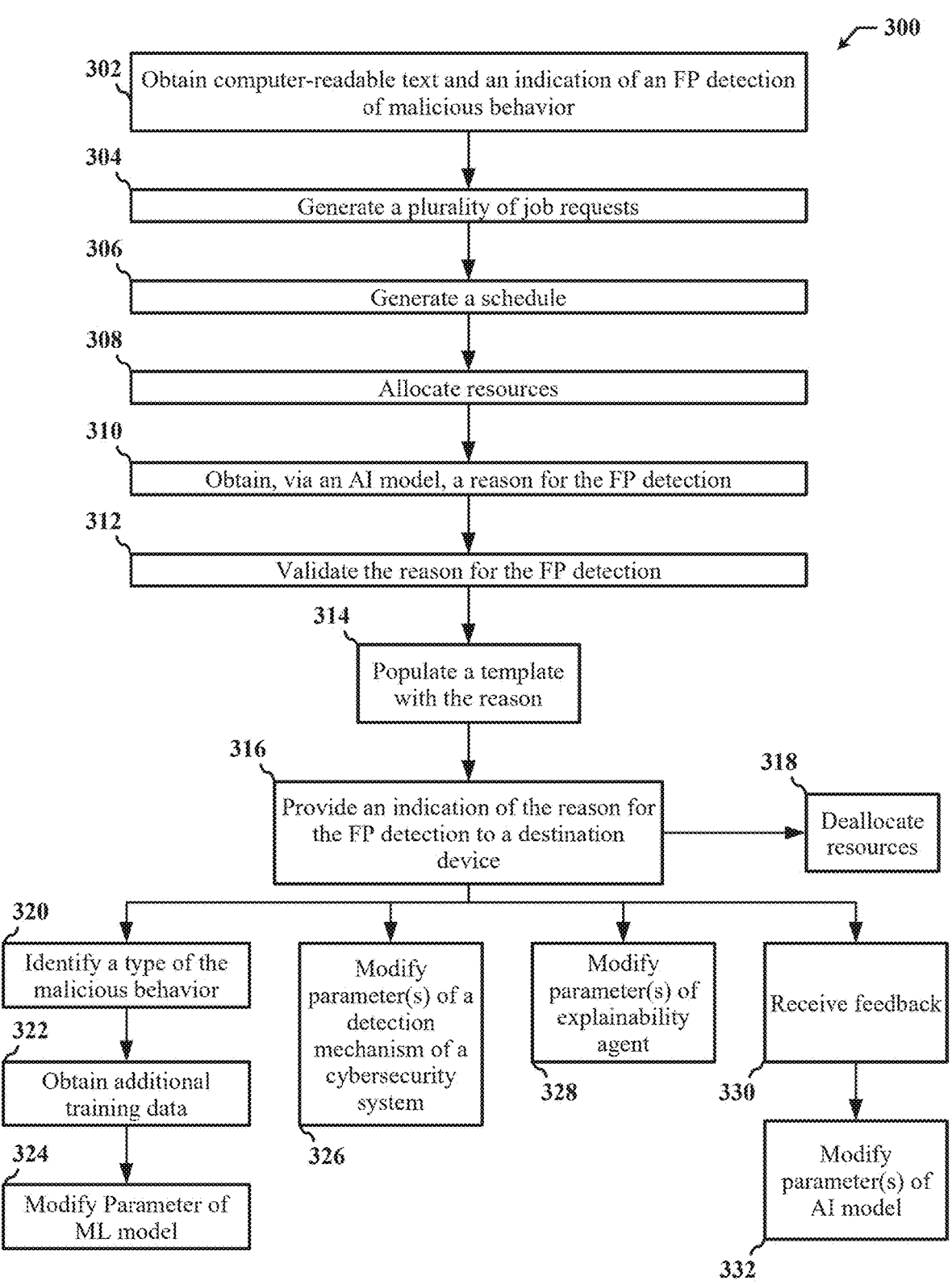
FIG. 3 is a flow diagram of a method of AI model-based detection explainability in accordance with some aspects of the present disclosure

FIG. 3 is a flow diagram 300 of a method for AI model-based detection explainability in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the AI model 128 (shown in FIG. 1), the processing device 404 (shown in FIG. 5), the processing device 502 (shown in FIG. 5), or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 302, the processing logic obtains computer-readable text and an indication of a false positive detection of malicious behavior with respect to the computer-readable text by a cybersecurity system. In an example, the computer-readable text and the indication of the false positive detection may be included in a ticket. In an example, the cyber-security system may be or include the cybersecurity system 106. In an example, the computer-readable text and the indication of the false positive detection may be included in the AI model request 118. In one aspect, the processing logic obtains the computer-readable text and the indication of the false positive detection from a user device operated by a user. In an example, the user device is the user device 102 and the user is the user 104. In one aspect, the malicious behavior includes detected malware. In one aspect, the computer-readable text includes at least one of an email, a script, a uniform resource locator (URL), a text message, a team communication platform message, or source code.

At block 304, the processing logic may generate a plurality of job requests, wherein the plurality of job requests includes a job request comprising the computer-readable text and the indication of the false positive detection. For example, the job scheduler 120 may generate the plurality of job requests.

At block 306, the processing logic may generate a schedule for the plurality of job requests including the job request. For example, the job scheduler 120 may generate the schedule.

At block 308, the processing logic may allocate resources for the job request based on the schedule. For example, the resources may be resources of the cloud 122. In an example, the resources may pertain to the cloud instance 126. In an example, the resources may be network resources.

At block 310, the processing logic obtains, via an AI model trained to generate language, a reason for the false positive detection of the malicious behavior with respect to the computer-readable text by the cybersecurity system. In an example, the AI model may be or include the AI model 128. In an example, the reason for the false positive detection may be included in the AI model response 130. In one aspect, the AI model is a hosted at a cloud device (i.e., the cloud), and obtaining the reason for the false positive detection includes transmitting, to the cloud device, a request comprising the computer-readable text and the indication of the false positive detection of the malicious behavior and receiving, from the cloud device and based on the request, the reason for the false positive detection of the malicious behavior. In another aspect, the AI model is a local AI model at a computing device at which the processing device resides. In such an aspect, obtaining the reason for the false positive detection includes providing the computer-readable text and the indication of the false positive detection of the malicious behavior as input to the AI model and obtaining the reason for the false positive detection of the malicious behavior as an output of the AI model.

At block 312, the processing logic may validate the reason for the false positive detection. In an example, the validation may be performed by the automated validator 134 in the validation step 132. For instance, the automated validator 134 may validate the AI model response 130.

At block 314, the processing logic may populate a template with the reason for the false positive detection, wherein providing the indication of the reason for the false positive detection includes transmitting the populated template to the user device. In an example, the client response generator 140 may populate the template. In an example, the populated template may be or include the generated response 142.

At block 316, the processing logic provides an indication of the reason for the false positive detection to a destination device. In an example, the reason for the false positive detection may be included in the AI model response 130. In an example, the destination device may be or include the user device 102, the security team device 144, a device that manages/operates the cybersecurity system, a device that manages/operates the explainability model, a device that manages the AI model, or another device. In one aspect, providing the indication of the reason includes transmitting, to a user device and by way of a network, the indication of the reason. In one aspect, providing the indication of the reason includes transmitting a populated template to the user device. In one aspect, the indication of the reason for the false positive detection includes an indication of assessment of a maliciousness of the computer-readable text, the indi-cation of the reason for the false positive detection, and an indication of a portion of the computer-readable text which caused the false positive detection.

At block 318, the processing logic may deallocate resources for the aforementioned job request subsequent to providing the indication of the reason for the false positive detection.

At block 320, the processing logic may identify a type of the malicious behavior based on at least one of the com-puter-readable text or the indication of the false positive detection. The cybersecurity system may include a machine learning model trained based on training data to detect the malicious behavior. In an example, the type of the malicious behavior may be a phishing attack.

At block 322, the processing logic may obtain additional training data corresponding to the type of the malicious behavior. For example, the additional training data may correspond to additional instances of phishing attacks along with the labels that label the additional instances as phishing attacks.

At block 324, the processing logic may modify at least one parameter of the machine learning model based on additional training data. In an example, the at least one parameter may be a weight of a neural network. In an example, the processing logic may retrain the machine learning model or fine-tune the machine learning model based on the additional training data. Retraining or fine-tuning the machine learning model may change the value of the weight of the neural network. In an example, the at least one parameter may be included in the parameters 110.

At block 326, the processing logic may modify at least one parameter of a detection mechanism of the cybersecurity system based on the reason for the false positive detection. For example, the detection mechanism may be or include the detection mechanism 108 and the at least one parameter may be included in the parameters 110. In an example, the at least one parameter may be a rule or a learned parameter (e.g., a weight of a neural network).

At block 328, the computer-readable text may include a first portion related to the false positive detection and a second portion unrelated to the false positive detection, where the second portion is larger than the first portion, and the processing logic may modify at least one parameter of an explainability agent based on the first portion of the computer-readable text. In an example, the explainability agent may be or include the explainability agent 148.

At block 330, the processing logic may receive feedback from the destination device based on the indication of the reason for the false positive detection. For example, the feedback may pertain to a "hallucination" by the AI model 128.

At block 332, the processing logic may modify at least one parameter of the AI model based on the feedback. For example, the modification may mitigate further hallucinations.

FIG. 4 is a block diagram 400 that illustrates an example of a computing system 402 for AI model-based detection explainability in accordance with some aspects of the present disclosure. In some aspects, the computing system 402 may perform some or all of the functionality described herein. The computing system 402 includes a processing device 404 and memory 406. The memory 406 stores instructions 408 that are executed by the processing device 404. The instructions 408, when executed by the processing device 404, cause the processing device 404 to obtain computer-readable text 410 and an indication of an FP detection 412 of malicious behavior with respect to the computer-readable text 410 by a cybersecurity system 414. In some aspects, the cybersecurity system 414 may be part of the computing system 402. The computer-readable text 410 and the indication of the FP detection 412 may be collectively referred to as a ticket. In one aspect, obtaining the indication of the computer-readable text 410 and the indication of the FP detection 412 includes receiving the indication of the computer-readable text 410 and the indication of the FP detection 412 from a destination device 416. In another aspect, obtaining the indication of the computer-readable text 410 and the indication of the FP detection 412 includes receiving the indication of the computer-readable text 410 from the cybersecurity system 414 and the indication of the FP detection 412 from the destination device 416. In yet another aspect, obtaining the indication of the computer-readable text 410 and the indication of the FP detection 412 includes receiving the indication of the computer-readable text 410 from the destination device 416 and the indication of the FP detection 412 from the cybersecurity system 414. In a further aspect, obtaining the indication of the computer-readable text 410 and the indication of the FP detection 412 includes receiving the indication of the computer-readable text 410 and the indication of the FP detection 412 from the cybersecurity system 414.

The processing device 404 obtains, via an AI model 418 trained to generate language, a reason for the FP detection 412 of the malicious behavior with respect to the computer-readable text 410 by the cybersecurity system 414. The AI model 418 may be part of the computing system 402 or the AI model 418 may be hosted at a cloud-based computing platform. The processing device 404 provides the indication of the reason for the FP detection 412 to the destination device 416. The destination device 420 may be a client device operated by a user or a device used to maintain the cybersecurity system 414.

Figure 5:
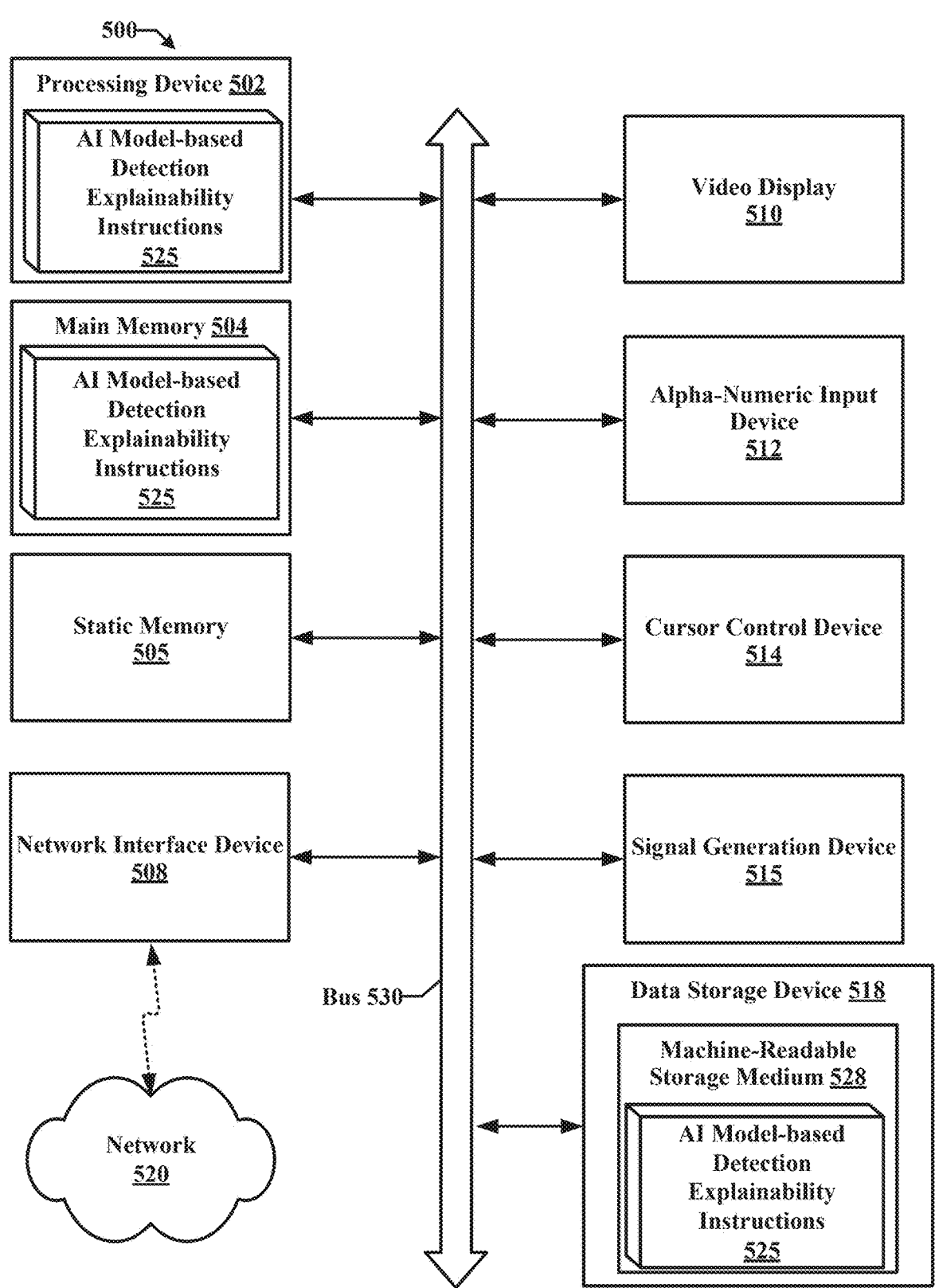
FIG. 5 is a block diagram of an example computing device that may perform one or more of the operations described herein in accordance with some aspects of the present disclosure.

FIG. 5 illustrates a diagrammatic representation of a machine in the example form of a computer system 500 within which a set of instructions, for causing the machine to perform any one or more of the methodologies discussed herein for AI model-based detection explainability.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, the computer system 500 may be representative of a server.

The computer system 500 includes a processing device 502, a main memory 504 (e.g., read-only memory (ROM), flash memory, dynamic random access memory (DRAM), a static memory 505 (e.g., flash memory, static random access memory (SRAM), etc.), and a data storage device 518 which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 500 may further include a network interface device 508 which may communicate with a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and a signal generation device 515 (e.g., an acoustic signal generation device, such as a speaker). In some embodiments, the video display unit 510, the alphanumeric input device 512, and the cursor control device 514 may be combined into a single component or device (e.g., an LCD touch screen).

The processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute AI model-based detection explainability instructions 525, for performing the operations and steps discussed herein. For example, the AI model-based detection explainability instructions 525 may include instructions for obtaining computer-readable text and an indication of a false positive detection of malicious behavior with respect to the computer-readable text by a cybersecurity system; obtaining, by a processing device and via an AI model trained to generate language, a reason for the false positive detection of the malicious behavior with respect to the computer-readable text by the cybersecurity system; and providing an indication of the reason for the false positive detection to a destination device.

The data storage device 518 may include a machine-readable storage medium 528 that stores the AI model-based detection explainability instructions (e.g., software) embodying any one or more of the methodologies of functions described herein. The AI model-based detection explainability instructions 525 may also reside, completely or at least partially, within the main memory 504 or within the processing device 502 during execution thereof by the computer system 500; the main memory 504 and the processing device 502 also constituting machine-readable storage media. The AI model-based detection explainability instructions 525 may further be transmitted or received over a network 520 via the network interface device 508.

While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "providing," "producing," "initiating," "determining," "marking," "adding," "performing," "generating," "inputting," "modifying," "including," "obtaining," "transmitting," "receiving," "identifying," "validating," "populating," "allocating," "deallocating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission, or display devices. Also, the terms "first," "second," "third," "fourth" etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:

obtaining, from a user device, a ticket comprising computer-readable text and an indication of a false positive detection of malicious behavior with respect to the computer-readable text by a cybersecurity system, wherein the cybersecurity system prevents the user device from performing an action based on the false positive detection;

generating a plurality of job requests, wherein the plurality of job requests includes a job request comprising the computer-readable text and the indication of the false positive detection;

generating a schedule for the plurality of job requests including the job request;

allocating resources for the job request based on the schedule;

obtaining, by a processing device and via an artificial intelligence (AI) model trained to generate language, a reason for the false positive detection of the malicious behavior based on the allocated resources;

validating the reason for the false positive detection by determining an absence of a hallucination of the AI model in the reason for the false positive detection;

providing an indication of the reason for the false positive detection to a destination device; and deallocating the allocated resources subsequent to providing the indication of the reason for the false positive detection.

2. The method of claim 1, wherein the destination device is the user device, wherein obtaining the computer-readable text and the indication of the false positive detection of the malicious behavior comprises receiving, from the user device and by way of a network, the computer-readable text and the indication of the false positive detection of the malicious behavior, and wherein providing the indication of the reason comprises transmitting to the user device and by way of the network, the indication of the reason.

3. The method of claim 1, wherein the cybersecurity system comprises a machine learning model trained to detect the malicious behavior, the method further comprising:

identifying a type of the malicious behavior based on at least one of the computer-readable text or the indication of the false positive detection;

obtaining additional training data corresponding to the type of the malicious behavior; and modifying at least one parameter of the machine learning model based on the additional training data.

4. The method of claim 1, further comprising:

modifying at least one parameter of a malware detection mechanism of the cybersecurity system based on the reason for the false positive detection.

5. The method of claim 1, wherein the destination device comprises the user device, the method further comprising:

populating a template with the reason for the false positive detection, wherein providing the indication of the reason for the false positive detection comprises transmitting the populated template to the user device.

6. The method of claim 1, wherein the indication of the reason for the false positive detection comprises at least one of:

an indication of assessment of a maliciousness of the computer-readable text, a first indication of the reason for the false positive detection, or an indication of a portion of the computer-readable text which caused the false positive detection.

7. The method of claim 1, wherein the AI model is hosted at a cloud device, and wherein obtaining the reason for the false positive detection of the malicious behavior comprises:

transmitting, to the cloud device, a request comprising the computer-readable text and the indication of the false positive detection of the malicious behavior; and receiving, from the cloud device and based on the request, the reason for the false positive detection of the malicious behavior.

8. The method of claim 1, wherein obtaining the reason for the false positive detection of the malicious behavior comprises:

providing the computer-readable text and the indication of the false positive detection of the malicious behavior as input to the AI model; and obtaining the reason for the false positive detection of the malicious behavior as an output of the AI model.

9. The method of claim 1, wherein the computer-readable text comprises at least one of an email, a script, a uniform resource locator (URL), a text message, a team communication platform message, or source code.

10. The method of claim 1, wherein the computer-readable text comprises a first portion related to the false positive detection and a second portion unrelated to the false positive detection, wherein the indication of the reason for the false positive detection comprises the first portion, the method further comprising:

modify at least one parameter of an explainability agent based on the first portion of the computer-readable text.

11. The method of claim 1, further comprising:

receiving feedback from the destination device based on the indication of the reason for the false positive detection; and modifying at least one parameter of the AI model based on the feedback.

12. A system, comprising:

a memory; and a processing device, operatively coupled to the memory, to:

obtain, from a user device, a ticket comprising computer-readable text and an indication of a false positive detection of malicious behavior with respect to the computer-readable text by a cybersecurity system, wherein the cybersecurity system prevents the user device from performing an action based on the false positive detection;

generate a plurality of job requests, wherein the plurality of job requests includes a job request comprising the computer-readable text and the indication of the false positive detection;

generate a schedule for the plurality of job requests including the job request;

allocate resources for the job request based on the schedule;

obtain, via an artificial intelligence (AI) model trained to generate language, a reason for the false positive detection of the malicious behavior based on the allocated resources;

validate the reason for the false positive detection by determining an absence of a hallucination of the AI model in the reason for the false positive detection;

provide an indication of the reason for the false positive detection to a destination device; and deallocate the allocated resources subsequent to providing the indication of the reason for the false positive detection.

13. The system of claim 12, wherein the destination device is the user device, wherein to obtain the computer-readable text and the indication of the false positive detection of the malicious behavior, the processing device is to receive, from the user device and by way of a network, the computer-readable text and the indication of the false positive detection of the malicious behavior, and wherein to provide the indication of the reason, the processing device is to transmit, to the user device and by way of the network, the indication of the reason.

14. The system of claim 12, wherein the cybersecurity system comprises a machine learning model trained to detect the malicious behavior, and wherein the processing device is further to:

identify a type of the malicious behavior based on at least one of the computer-readable text or the indication of the false positive detection;

obtain additional training data corresponding to the type of the malicious behavior; and modify at least one parameter of the machine learning model based on the additional training data.

15. A non-transitory computer readable medium, having instructions stored thereon which, when executed by a processing device, cause the processing device to:

obtain, from a user device, a ticket comprising computer-readable text and an indication of a false positive detection of malicious behavior with respect to the computer-readable text by a cybersecurity system, wherein the cybersecurity system prevents the user device from performing an action based on the false positive detection;

generate a plurality of job requests, wherein the plurality of job requests includes a job request comprising the computer-readable text and the indication of the false positive detection;

generate a schedule for the plurality of job requests including the job request;

allocate resources for the job request based on the schedule;

obtain, by the processing device and via an artificial intelligence (AI) model trained to generate language, a reason for the false positive detection of the malicious behavior based on the allocated resources;

validate the reason for the false positive detection by determining an absence of a hallucination of the AI model in the reason for the false positive detection;

provide an indication of the reason for the false positive detection to a destination device; and deallocate the allocated resources subsequent to providing the indication of the reason for the false positive detection.

16. The non-transitory computer readable medium of claim 15, wherein the destination device is the user device, wherein to obtain the computer-readable text and the indication of the false positive detection of the malicious behavior, the instructions, when executed by the processing device, cause the processing device to receive, from the user device and by way of a network, the computer-readable text and the indication of the false positive detection of the malicious behavior, and wherein to provide the indication of the reason, the instructions, when executed by the processing device, cause the processing device to transmit, to the user device and by way of the network, the indication of the reason.

17. The non-transitory computer readable medium of claim 15, wherein the cybersecurity system comprises a machine learning model trained to detect the malicious behavior, and wherein the instructions, when executed by the processing device, cause the processing device further to:

identify a type of the malicious behavior based on at least one of the computer-readable text or the indication of the false positive detection;

obtain additional training data corresponding to the type of the malicious behavior; and modify at least one parameter of the machine learning model based on the additional training data.

18. The system of claim 12, wherein the computer-readable text comprises at least one of an email, a script, a uniform resource locator (URL), a text message, a team communication platform message, or source code.

19. The non-transitory computer readable medium of claim 15, wherein the computer-readable text comprises at least one of an email, a script, a uniform resource locator (URL), a text message, a team communication platform message, or source code.

20. The system of claim 12, wherein the processing device is further to:

receive feedback from the destination device based on the indication of the reason for the false positive detection; and modify at least one parameter of the AI model based on the feedback.

* * * * *